United States Patent
Hayashi et al.

(10) Patent No.: US 12,334,294 B2
(45) Date of Patent: Jun. 17, 2025

(54) POWER SUPPLY DEVICE

(71) Applicant: TOSHIBA MITSUBISHI-ELECTRIC INDUSTRIAL SYSTEMS CORPORATION, Chuo-ku (JP)

(72) Inventors: Yousuke Hayashi, Chuo-ku (JP); Xiaochen Zhang, Chuo-ku (JP); Haruyoshi Mori, Chuo-ku (JP)

(73) Assignee: TMEIC Corporation, Chuo-ku (JP)

( * ) Notice: Subject to any disclaimer, the term of this patent is extended or adjusted under 35 U.S.C. 154(b) by 196 days.

(21) Appl. No.: 18/002,906

(22) PCT Filed: May 14, 2021

(86) PCT No.: PCT/JP2021/018383
§ 371 (c)(1),
(2) Date: Dec. 22, 2022

(87) PCT Pub. No.: WO2022/239225
PCT Pub. Date: Nov. 17, 2022

(65) Prior Publication Data
US 2023/0352253 A1    Nov. 2, 2023

(51) Int. Cl.
*H01H 9/54* (2006.01)
*H02J 3/38* (2006.01)
(Continued)

(52) U.S. Cl.
CPC ............ *H01H 9/541* (2013.01); *H02J 3/381* (2013.01); *H02M 1/0009* (2021.05); *H02M 1/344* (2021.05)

(58) Field of Classification Search
CPC . H01H 9/541; H01H 9/54; H02J 3/381; H02J 7/34; H02J 9/06; H02J 9/062;
(Continued)

(56) References Cited

U.S. PATENT DOCUMENTS

2015/0280546 A1* 10/2015 Kouno ............... H02M 1/36
                                                                      363/132
2020/0366078 A1* 11/2020 Telefus ............... G01R 31/52

FOREIGN PATENT DOCUMENTS

JP    2003164166 A  *  6/2003
JP    2009-136099 A     6/2009
JP    2016149213 A  *  8/2016

OTHER PUBLICATIONS

Y. Wu, Y. Hu, Y. Wu, M. Rong and Q. Yi, "Investigation of an Active Current Injection DC Circuit Breaker Based on a Magnetic Induction Current Commutation Module," in IEEE Transactions on Power Delivery, vol. 33, No. 4, pp. 1809-1817, Aug. 2018 (Year: 2018).*

(Continued)

*Primary Examiner* — Thienvu V Tran
*Assistant Examiner* — Sreeya Sreevatsa
(74) *Attorney, Agent, or Firm* — Oblon, McClelland, Maier & Neustadt, L.L.P.

(57) ABSTRACT

An AC switch that includes a semiconductor switch and a snubber circuit connected in parallel between a first terminal connected to an AC power supply via a circuit breaker and a second terminal connected to a load. The power converter is connected between a power storage device and the second terminal. The current detector detects a current flowing through the AC switch. When the AC power supply is normal, the controller turns on the semiconductor switch. When an open state of the circuit breaker is detected, the controller controls the power converter to supply a current having a phase opposite to that of the current detected by the current detector to flow through the semiconductor switch and supply the AC power to the load. The controller further (Continued)

turns off the semiconductor switch in response to that the amplitude of the current detected by the current detector is 0.

5 Claims, 10 Drawing Sheets

(51) Int. Cl.
*H02M 1/00* (2007.01)
*H02M 1/34* (2007.01)

(58) Field of Classification Search
CPC ...... H02J 9/068; H02M 1/0009; H02M 1/344; H02M 1/348
USPC .......................................................... 361/13
See application file for complete search history.

(56) References Cited

OTHER PUBLICATIONS

International Search Report issued Jul. 13, 2021 in PCT/JP2021/018383, filed on May 14, 2021, 2 pages.
Office Action dated Feb. 14, 2025. issued in corresponding Korean patent application No. 10-2023-7000253 (with machine translation).

* cited by examiner

POWER SUPPLY DEVICE

TECHNICAL FIELD

The present disclosure relates to a power supply device.

BACKGROUND ART

Japanese Patent Laying-Open No. 2009-136099 (PTL 1) discloses a power supply device. The power supply device includes an input terminal connected to an AC power supply, an output terminal connected to a load, an AC switch connected between the input terminal and the output terminal, a bidirectional power conversion circuit connected to the input terminal via the AC switch, a power storage device connected to the bidirectional power conversion circuit, and a voltage detector that detects an AC voltage input to the input terminal.

The power supply device disclosed in PTL 1 determines whether the AC voltage input to the input terminal is normal or abnormal based on the detection value of the voltage detector. If the AC voltage is normal, the power supply device turns on the AC switch, and controls the bidirectional power conversion circuit to charge the power storage device. On the other hand, if the AC voltage is abnormal, the power supply device turns off the AC switch, and controls the bidirectional power conversion circuit to supply power from the power storage device to the load.

CITATION LIST

Patent Literature

PTL 1: Japanese Patent Laying-Open No. 2009-136099

SUMMARY OF INVENTION

Technical Problem

In the PTL 1, in order to perform the ON/OFF operation at high speed, a semiconductor switch is employed in the AC switch. However, if the semiconductor switch is suddenly turned off when a current is flowing through the semiconductor switch, a surge voltage may be generated between the terminals of the semiconductor switch.

In order to prevent the surge voltage from being generated when the semiconductor switch is turned off, a snubber circuit (such as a snubber capacitor) may be connected in parallel to the semiconductor switch. However, if the semiconductor switch is turned off when a current is flowing through the semiconductor switch, in other words, when there is energy stored in the snubber capacitor, the energy stored in the snubber capacitor flows through the voltage detector, which may bring an inductance in the voltage detector to magnetic saturation. In such a case, the magnetic saturation of the inductance may cause a resonance phenomenon to occur between the inductance and the snubber capacitor.

The present disclosure has been made to solve the aforementioned problems, and an object of the present disclosure is to provide a power supply device which includes a semiconductor switch connected between an AC power supply and a load and is capable of preventing a resonance phenomenon from occurring when the semiconductor switch is turned off.

Solution to Problem

The power supply device according to an aspect of the present disclosure includes a first terminal, a second terminal, an AC switch, a power converter, a current detector, a voltage detector, and a controller. The first terminal is connected to an AC power supply via a circuit breaker. The second terminal is connected to a load. The AC switch includes a semiconductor switch and a snubber circuit connected in parallel to each other between a first terminal and a second terminal. The power converter is connected between a power storage device and the second terminal to convert DC power from the power storage device into AC power and output the AC power to the second terminal. The current detector detects a current flowing through the AC switch. The voltage detector detects an AC voltage input to the first terminal. The controller controls the AC switch and the power converter based on a detection value of the voltage detector. When the AC power supply is normal, the controller turns on the semiconductor switch so as to supply the AC power from the AC power supply to the load via the AC switch. When an open state of the circuit breaker is detected, the controller controls the power converter so as to supply a current having a phase opposite to that of the current detected by the current detector to flow through the semiconductor switch and supply the AC power to the load. The controller further turns off the semiconductor switch in response to that the amplitude of the detection value of the current detector is 0.

Advantageous Effects of Invention

According to the present disclosure, in a power supply device including a semiconductor switch connected between an AC power supply and a load, it is possible to prevent a resonance phenomenon from occurring when the semiconductor switch is turned off.

DESCRIPTION OF EMBODIMENTS

Figure 1:
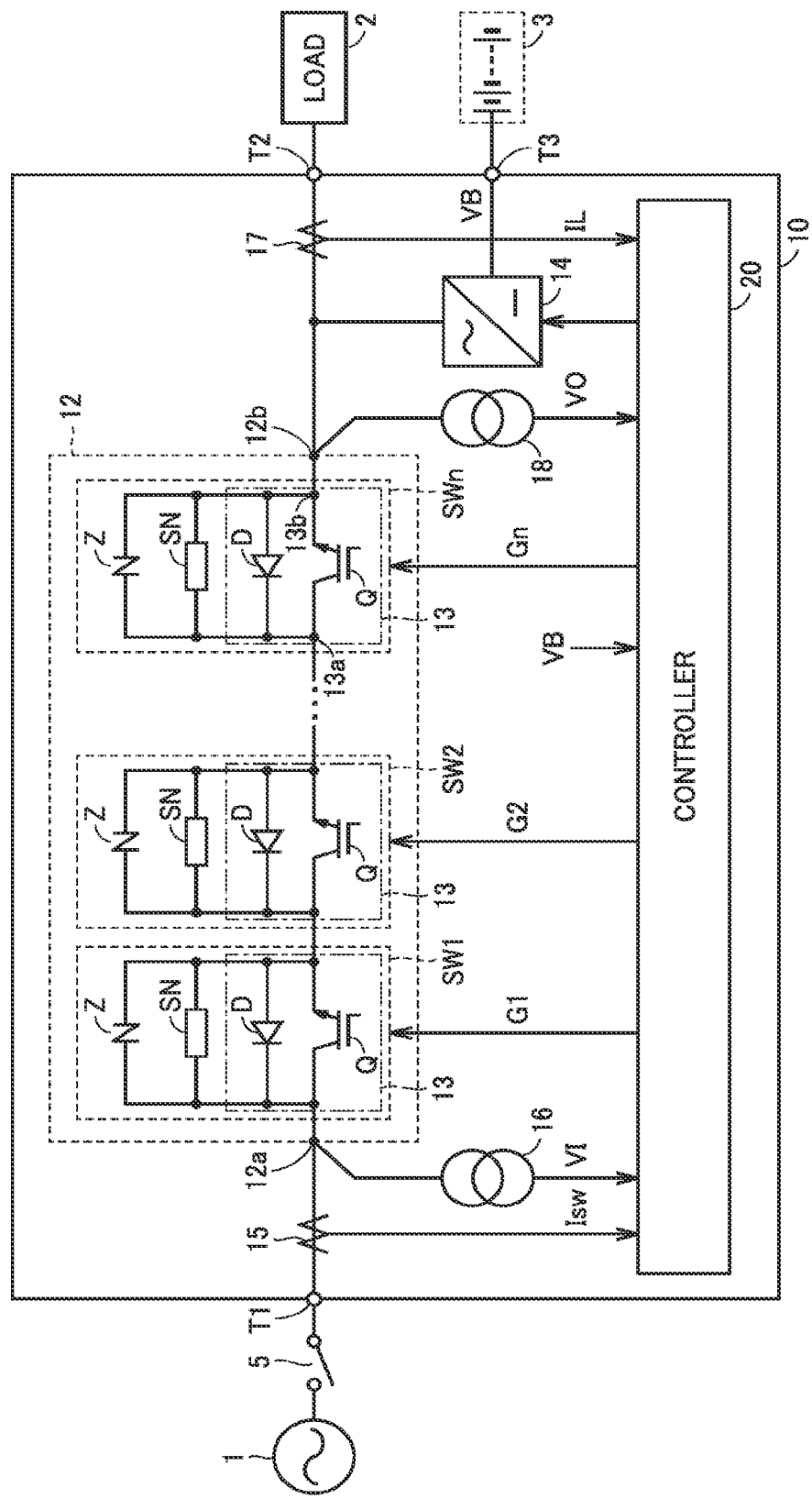
FIG. 1 is a diagram illustrating a schematic configuration of a power supply device according to a first embodiment.

Hereinafter, embodiments of the present disclosure will be described in detail with reference to the drawings. In the following description, the same or corresponding portions in the drawings will be denoted by the same reference numerals, and the description thereof will not be repeated in principle.

First Embodiment

FIG. 1 is a diagram illustrating a schematic configuration of a power supply device according to a first embodiment.

As illustrated in FIG. 1, a power supply device 10 according to the first embodiment is connected between an AC power supply 1 and a load 2, and is configured to receive AC power from the AC power supply 1 and supply the AC power to the load 2. The power supply device 10 may be applied to, for example, an apparatus (such as a multiple power compensator) which supplies constant AC power to the load 2 without instantaneous interruption when a power outage or an instantaneous voltage drop occurs in the AC power supply 1.

The AC power supply 1 is typically a commercial AC power supply which supplies AC power of a commercial frequency to the power supply device 10. The load 2 is driven by the AC power of a commercial frequency supplied from the power supply device 10. Although FIG. 1 illustrates only a portion related to one-phase AC power, the power supply device 10 may receive three-phase AC power and output the three-phase AC power.

As illustrated in FIG. 1, the power supply device 10 includes an input terminal T1, an output terminal T2, a DC terminal T3, a switch circuit 12, a bidirectional converter 14, a current detector 15, a current detector 17, a voltage detector 16, a voltage detector 18, and a controller 20.

The input terminal T1 is electrically connected to the AC power supply 1 via the circuit breaker 5, and receives an AC voltage VI of a commercial frequency supplied from the AC power supply 1. The input terminal T1 corresponds to an example of a "first terminal". The circuit breaker 5 is, for example, a vacuum circuit breaker (VCB). The circuit breaker 5 has a mechanical switch. The circuit breaker 5 is opened in response to an open command sent from a host controller (not shown) during the maintenance or inspection of a power system equipped with the power supply device 10. Alternatively, when a ground fault or the like occurs in the power system, the circuit breaker 5 opens autonomously upon receipt of a signal from a relay (not shown) so as to cut off the accident current. However, since the circuit breaker 5 has a mechanical switch, it takes several tens of milliseconds to open the circuit breaker 5.

The output terminal T2 is connected to the load 2. The load 2 is driven by an AC voltage VO supplied from the output terminal T2. The output terminal T2 corresponds to an example of a "second terminal".

The DC terminal T3 is connected to the battery 3. The battery 3 corresponds to an example of a "power storage device" that stores DC power. As a substitute for the battery 3, an electric double layer capacitor may be connected to the DC terminal T3 as the power storage device. The instantaneous value of a DC voltage VB of the DC terminal T3 (the voltage between the terminals of the battery 3) is detected by the controller 20.

The switch circuit 12 is connected between the input terminal T1 and the output terminal T2, and is configured to switch the electrical connection and disconnection between the AC power supply 1 and the load 2. Specifically, the switch circuit 12 includes an input node 12a, an output node 12b, and n (n is an integer of 2 or more) AC switches SW1 to SWn. The input node 12a is connected to the input terminal T1, and the output node 12b is connected to the output terminal T2. The number of AC switches is not limited to 2 or more, it may be one only.

The n AC switches SW1 to SWn are connected in series between the input node 12a and the output node 12b. The conduction (ON) and cutoff (OFF) of the AC switches SW1 to SWn are controlled by gate signals G1 to Gn sent from the controller 20, respectively. Hereinafter, the AC switches SW1 to SWn may be collectively referred to as the "AC switch SW", and the gate signals G1 to Gn may be collectively referred to as the "gate signal G".

The AC switch SW includes a semiconductor switch 13, a snubber circuit SN, and a varistor Z. The semiconductor switch 13 includes a first terminal 13a, a second terminal 13b, an insulated gate bipolar transistor (IGBT) Q, and a diode D connected in anti-parallel to the IGBT Q. The collector of the IGBT Q is connected to the first terminal 13a of the semiconductor switch 13, and the emitter thereof is connected to the second terminal 13b. The diode D is connected in a forward direction from the second terminal 13b toward the first terminal 13a. The diode D is a freewheel diode. Note that the semiconductor switch 13 is not limited to an IGBT, it may be a self-arc-extinguishing semiconductor switching element.

The semiconductor switch 13 is turned on by a gate signal G of an H (logically high) level and turned off by a gate signal G of an L (logically low) level. In other words, the gate signal G of the H level corresponds to an ON command (conduction command) for turning on the semiconductor switch 13, and the gate signal G of the L level corresponds to an OFF command (cutoff command) for turning off the semiconductor switch 13.

The snubber circuit SN is connected in parallel to the semiconductor switch 13 so as to protect the corresponding semiconductor switch 13 from a surge voltage. The snubber circuit SN includes, for example, a resistor element and a capacitor connected in series between the terminals 13a and 13b. If the semiconductor switch 13 is suddenly turned off when a current is flowing through the semiconductor switch 13, a surge voltage is generated between the terminals 13a and 13b due to self-inductance. The snubber circuit SN protects the semiconductor switch 13 by preventing the surge voltage from being generated.

The varistor Z is connected between the terminals 13a and 13b. The varistor Z is a resistor whose resistance value is voltage-dependent. The varistor Z is, for example, ZnR (zinc oxide nonlinear resistor). The resistance value of the varistor Z varies in response to a voltage between the terminals thereof, and rapidly drops as the voltage exceeds a predetermined threshold voltage. Therefore, the varistor Z can prevent the voltage between the terminals 13a and 13b from exceeding the threshold voltage, and thereby prevent the semiconductor switch 13 from being destroyed by the surge voltage.

Figure 2:
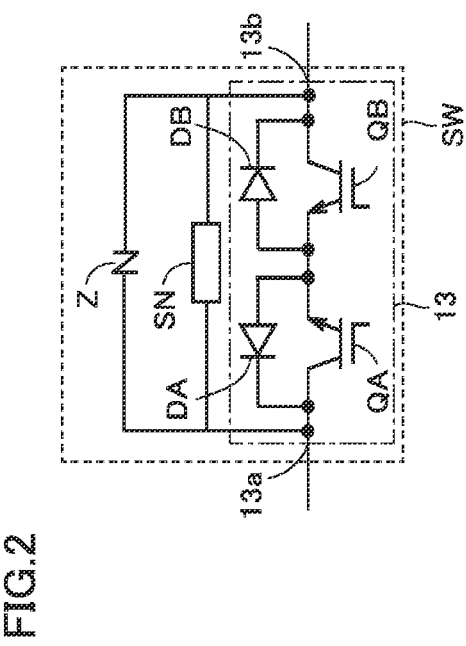
FIG. 2 is a circuit diagram illustrating another example configuration of an AC switch illustrated in FIG. 1.

The AC switch SW is not limited to the configuration illustrated in FIG. 1, it may have a configuration illustrated in FIG. 2, for example. In the example of FIG. 2, the AC switch SW includes IGBTs QA and QB connected in anti-series, a diode D1A connected in anti-parallel to the IGBT QA, a diode D1B connected in anti-parallel to the IGBT QB, a snubber circuit SN, and a varistor Z. The collector of the IGBT QA is connected to the first terminal 13a, and the emitter thereof is connected to the emitter of the IGBT QB. The collector of IGBT QB is connected to the second terminal 13b. The diode DA is connected in a forward direction from the second terminal 13b toward the first terminal 13a. The diode DB is connected in a forward direction from the first terminal 13a toward the second terminal 13b. The snubber circuit SN is connected in parallel with the series circuit of the IGBTs QA and QB.

Referring back to FIG. 1, the bidirectional converter 14 is connected between the output node 12b of the switch circuit 12 and the DC terminal T3. The bidirectional converter 14 is configured to perform bidirectional power conversion between the AC power output to the output node 12b and the DC power stored in the battery 3. The bidirectional converter 14 corresponds to an example of a "power converter".

When AC power is normally supplied from the AC power supply 1, the bidirectional converter 14 converts the AC power supplied from the AC power supply 1 via the switch circuit 12 into DC power and stores the DC power in the battery 3. On the other hand, when the supply of AC power from the AC power supply 1 is interrupted, or when an instantaneous voltage drop occurs in the AC power supply 1, the bidirectional converter 14 converts the DC power from the battery 3 into AC power of a commercial frequency, and supplies the AC power to the load 2.

The bidirectional converter 14 includes a plurality of semiconductor switching elements (not shown). The ON/OFF of the plurality of semiconductor switching elements is controlled by a control signal generated by the controller 20. The control signal is a sequence of pulse signals or a PWM (Pulse Width Modulation) signal. When the plurality of semiconductor switching elements are turned on or off in response to the control signal, the bidirectional converter 14 performs bidirectional power conversion between the AC power output to the output node 12b and the DC power input to or output from the DC terminal T3.

The voltage detector 16 detects an instantaneous value of the AC voltage VI supplied from the AC power supply 1 to the input terminal T1, and sends a signal indicating the detection value to the controller 20. A voltage transformer (VT) may be used in the voltage detector 16. The controller 20 determines whether or not the AC voltage VI is normally supplied from the AC power supply 1 based on the instantaneous value of the AC voltage VI. For example, if the AC voltage VI is higher than a predetermined lower limit voltage, the controller 20 determines that the AC voltage VI is normally supplied. If the AC voltage VI drops below the lower limit voltage, the controller 20 determines that the AC voltage VI is not normally supplied.

The voltage detector 18 detects an instantaneous value of the AC voltage VO at the output terminal T2, and sends a signal indicating the detection value to the controller 20.

The current detector 15 detects an instantaneous value of an AC current Isw flowing through the switch circuit 12 (the AC switch SW), and sends a signal indicating the detection value to the controller 20. The current detector 17 detects an instantaneous value of an AC current (hereinafter also referred to as "load current") IL flowing through the output terminal T2, and sends a signal indicating the detection value to the controller 20.

The controller 20 controls the ON/OFF of the switch circuit 12 (AC switch SW) and the operation of the bidirectional converter 14 based on instructions sent from a host controller (not shown), signals sent from the voltage detectors 16 and 18 and the current detectors 15 and 17, or the like. The controller 20 may be constructed from, for example, a microcomputer or the like. For example, the controller 20 may include a CPU (Central Processing Unit) and a memory (not shown), and may perform control operations to be described below via software processing by causing the CPU to execute a program stored in advance in the memory. Alternatively, a part of or all of the control operations may be performed via hardware processing instead of software processing by using a built-in dedicated electronic circuit or the like.

Hereinafter, the operation of the power supply device 10 according to the first embodiment will be described.

When the AC power supply 1 is normal, each AC switch SW of the switch circuit 12 is turned on, and the AC power is supplied from the AC power supply 1 to the load 2 via the switch circuit 12 to drive the load 2. Meanwhile, the AC power is supplied from the AC power supply 1 to the bidirectional converter 14 via the switch circuit 12, and the AC power is converted into DC power and stored in the battery 3. At this time, the controller 20 controls the bidirectional converter 14 so as to make the voltage VB between the terminals of the battery 3 equal to a reference voltage VBr.

When the AC power supply 1 is abnormal (when a power outage or an instantaneous voltage drop occurs in the AC power supply 1), each AC switch SW of the switch circuit 12 is instantaneously turned off, and the DC power from the battery 3 is converted into AC power by the bidirectional converter 14 and supplied to the load 2. Therefore, even when the AC power supply 1 is abnormal, it is possible to keep the load 2 operating continuously as long as the battery 3 is stored with DC power. At this time, the controller 20 controls the bidirectional converter 14 so as to make the AC voltage VO equal to a reference voltage VOr based on the AC voltage VO and the load current IL. When the voltage VB between the terminals of the battery 3 drops to the lower limit voltage, the controller 20 stops the operation of the bidirectional converter 14.

If the circuit breaker 5 is opened while AC power is being supplied from the AC power supply 1, a power outage occurs in the AC power supply 1 of the power supply device 10. As described above, the circuit breaker 5 is opened in response to an open command from a host controller. Alternatively, when a ground fault or the like occurs in the power system equipped with the AC power supply 1, the circuit breaker 5 opens autonomously.

Figure 3:
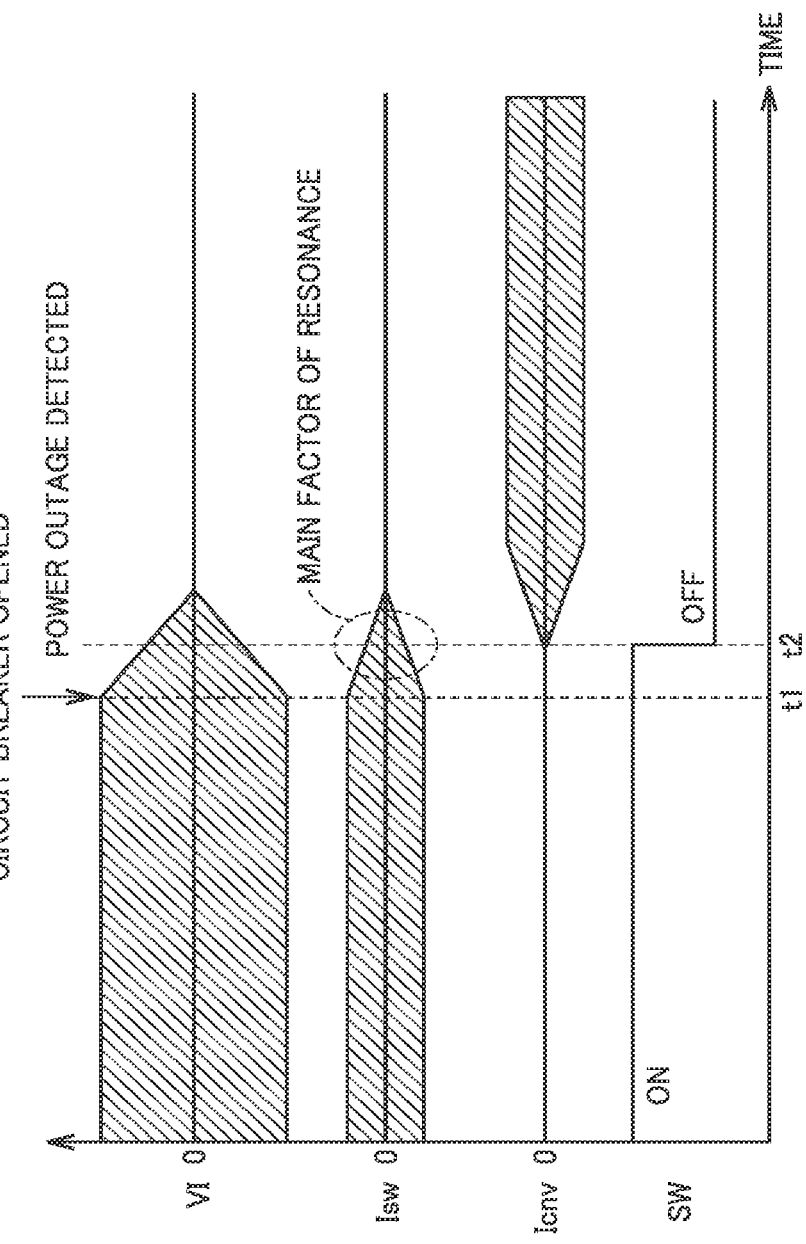
FIG. 3 is a timing chart illustrating the operation of the power supply device when a power outage occurs.

FIG. 3 is a timing chart illustrating the operation of the power supply device 10 when a power outage occurs in the AC power supply 1. FIG. 3 shows time waveforms of the AC voltage VI, the AC current Isw flowing through the AC switch SW of the switch circuit 12, an AC current Icnv output from the bidirectional converter 14, and the state of the AC switch SW.

In FIG. 3, it is assumed that the circuit breaker 5 is opened at time t1 when the AC power supply 1 is normal. Before time t1, the AC switch SW is turned on, and the AC power is supplied from the AC power supply 1 to the load 2 via the AC switch SW. At this time, the operation of the bidirectional converter 14 is stopped. However, as described above, when the AC power supply 1 is normal, the controller 20 may activate the bidirectional converter 14 so as to store the DC power in the battery 3.

When the circuit breaker 5 is opened at time t1, the amplitude of the AC voltage VI and the amplitude of the AC current Isw decrease after time t1 in response to the open operation of the circuit breaker 5.

In the power supply device 10, when the AC voltage VI detected by the voltage detector 16 drops below the lower limit voltage (at time t2), the controller 20 determines that the AC voltage VI is not normally supplied, and thereby turns off each AC switch SW of the switch circuit 12. Specifically, the controller 20 generates an L-level gate signal G and sends the generated gate signal G to the semiconductor switch 13 of each AC switch SW.

Further, the controller 20 activates the bidirectional converter 14. The bidirectional converter 14 converts the DC power from the battery 3 into AC power and supplies the AC power to the load 2. As a result, after time t2, the amplitude of the AC current Icnv output from the bidirectional converter 14 is increased.

As illustrated in FIG. 3, at the time (time t2) when the AC switch SW is turned off, a current flows through the semiconductor switch 13 of the AC switch SW. Therefore, when the semiconductor switch 13 is turned off, a surge voltage is generated between the terminals 13a and 13b of the semiconductor switch 13. The snubber circuit SN protects the semiconductor switch 13 by preventing the surge voltage from being generated.

However, if the semiconductor switch 13 is turned off when a current is flowing through the semiconductor switch 13, in other words, when there is energy stored in the capacitor of the snubber circuit SN, the energy stored in the capacitor flows through the voltage detector (voltage transformer) 16, which may bring an inductance of the voltage detector 16 to magnetic saturation. In such a case, the magnetic saturation of the inductance may cause a resonance phenomenon to occur between the inductance and the capacitor.

In order to prevent the resonance phenomenon from occurring, it is required to prevent the generation of a surge voltage when the semiconductor switch 13 is turned off. To this end, it is necessary to turn off the semiconductor switch 13 when there is no current flowing through the semiconductor switch 13.

Figure 4:
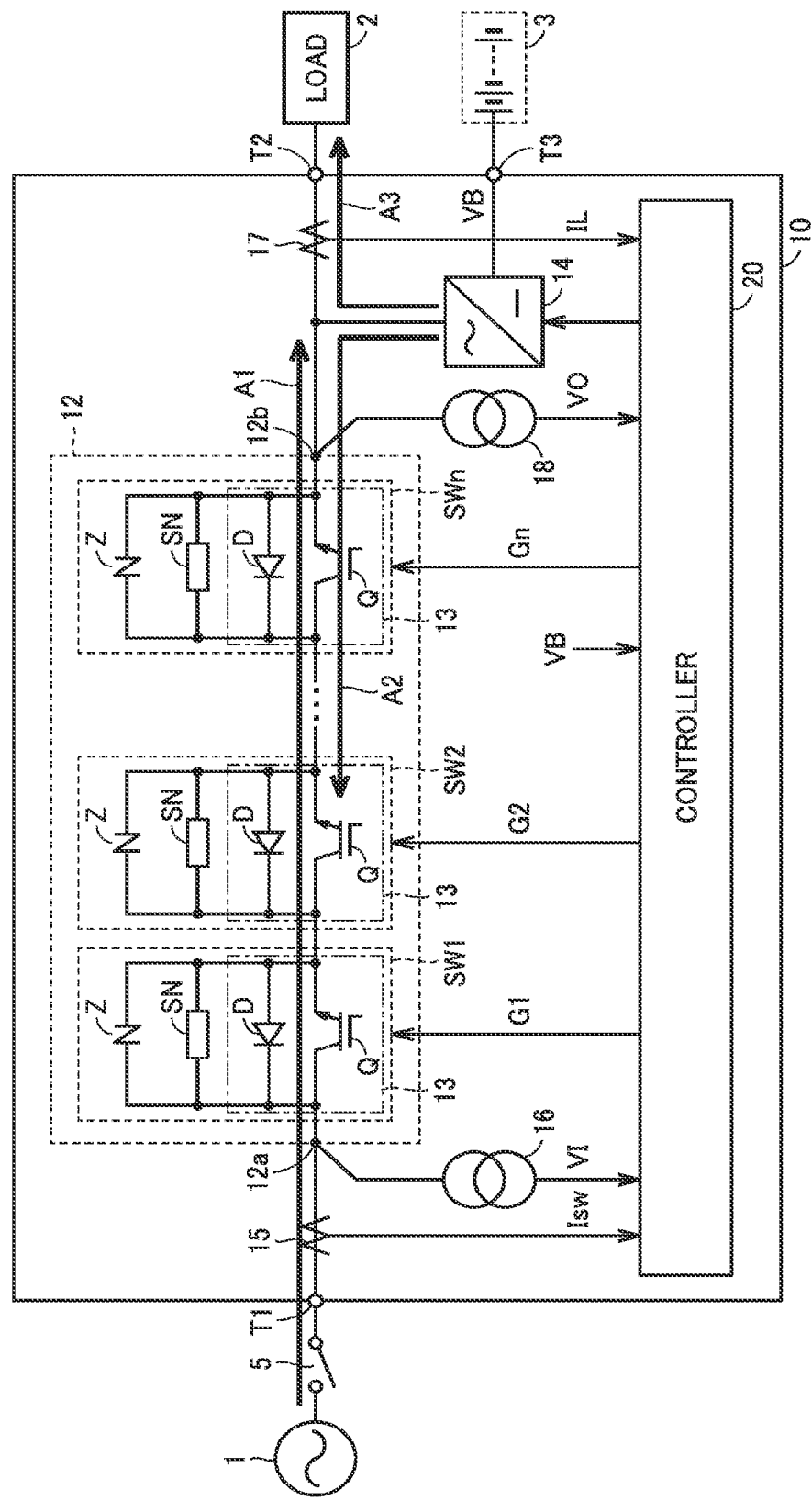
FIG. 4 is a diagram illustrating the operation of the power supply device according to the first embodiment.

FIG. 4 is a diagram illustrating the operation of the power supply device 10 according to the first embodiment.

As illustrated in FIG. 4, when the AC switch SW is turned on, AC power is supplied from the AC power supply 1 to the load 2 via the AC switch SW. At this time, the operation of the bidirectional converter 14 is stopped. In this case, as indicated by an arrow A1 in FIG. 4, the AC current supplied from the AC current power supply 1 flows through the AC switch SW and is supplied to the load 2. In other words, the AC current Isw flowing through the AC switch SW becomes equal to the load current IL.

When it is detected that the circuit breaker 5 is opened in such a situation, the controller 20 activates the bidirectional converter 14, and controls the bidirectional converter 14 to convert the DC power from the battery 3 into AC power.

Specifically, as indicated by an arrow A2 in FIG. 4, the controller 20 controls the bidirectional converter 14 so as to supply an AC current having a phase opposite to that of the AC current Isw to flow through the AC switch SW. The AC current having an opposite phase is an AC current which has the same period as the AC current Isw and a phase difference of 180° with respect to the AC current Isw. The AC current Isw and the AC current having the opposite phase may cancel each other to decrease the amplitude of the AC current Isw. If the AC current Isw has the same amplitude as that of the AC current having an opposite phase, the amplitude of the AC current Isw becomes equal to 0 A. If the semiconductor switch 13 is turned off when the amplitude of the AC current Isw is 0 A, in other words, when there is no current flowing through the semiconductor switch 13 of the AC switch SW, it is possible to prevent a surge voltage being generated.

Further, as indicated by an arrow A3 in FIG. 4, the controller 20 controls the bidirectional converter 14 so as to make the load current IL equal to a reference current ILr. Thus, the AC current Icnv output from the bidirectional converter 14 is supplied to the AC switch SW and to the load 2. Therefore, during a period in which the AC switch SW is switched from ON to OFF, the load current IL may be stably supplied to the load 2.

Figure 5:
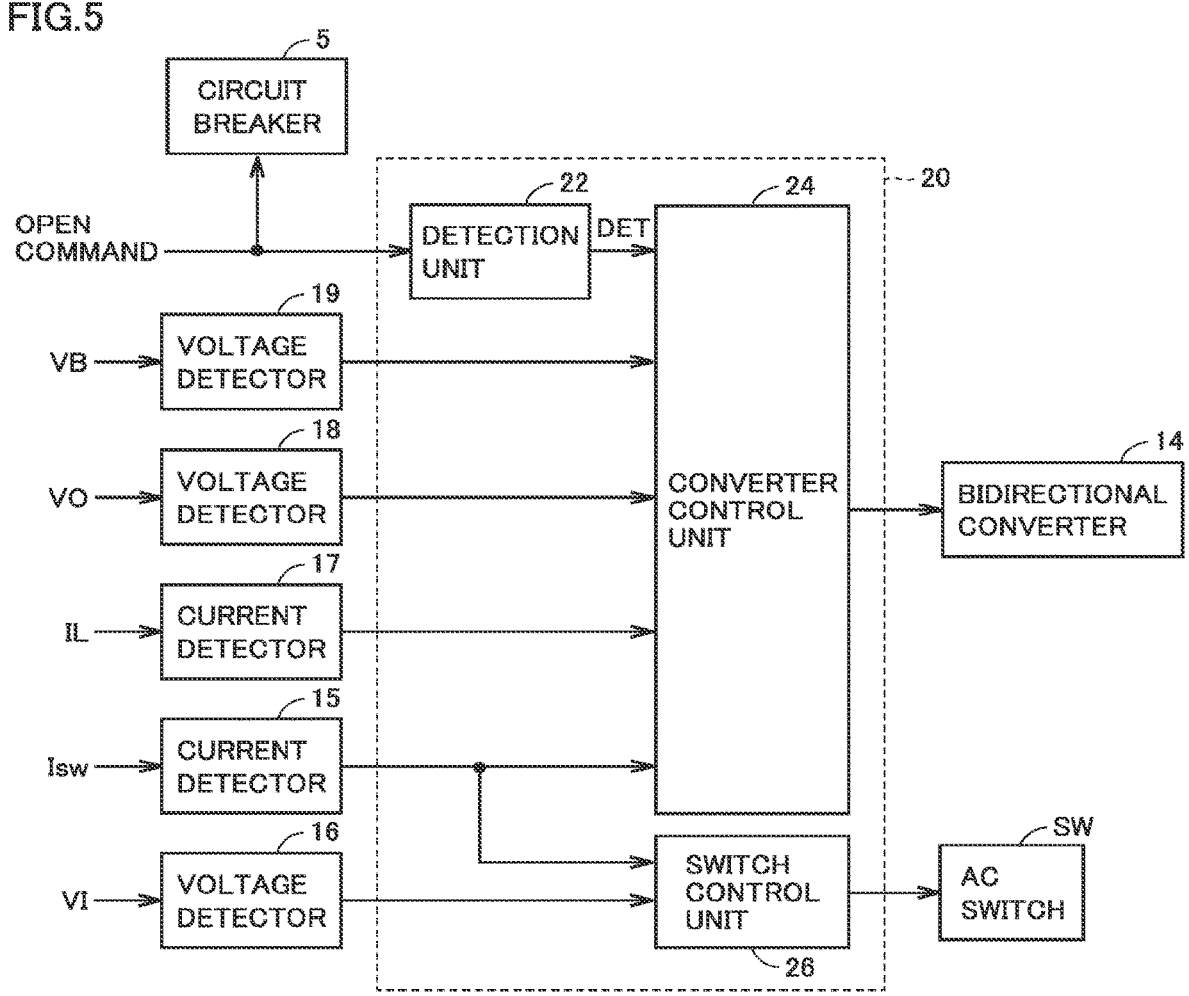
FIG. 5 is a block diagram illustrating a configuration of a controller.

FIG. 5 is a block diagram illustrating the configuration of a portion of the controller 20 related to the control of the bidirectional converter 14 and the AC switch SW. As illustrated in FIG. 5, the controller 20 includes a detection unit 22, a converter control unit 24, and a switch control unit 26.

The circuit breaker 5 starts the open operation of the mechanical switch in response to an open command sent from a host controller (not shown). As a result, the circuit breaker 5 is opened several tens of milliseconds after the circuit breaker 5 receives the open command, and thereby a power outage occurs in the AC power supply 1.

The detection unit 22 is configured to detect the open command sent to the circuit breaker 5. For example, the detection unit 22 detects the open command sent to the circuit breaker 5 by receiving the open command sent from the host controller. Upon detecting the open command, the detection unit 22 sends an H-level detection signal DET to the converter control unit 24. On the other hand, if the open command is not detected, the detection unit 22 sends an L-level detection signal DET to the converter control unit 24.

The converter control unit 24, based on the AC current Isw detected by the current detector 15, the load current IL detected by the current detector 17, the voltage VB between the terminals of the battery 3 detected by the voltage detector 19, the AC voltage VO detected by the voltage detector 18 and the like, generates a control signal (PWM signal) to control the bidirectional converter 14.

Specifically, the converter control unit 24 generates a current command value Icnv1 having the same phase as the AC current Isw (Icnv1=Isw), and generates a current command value Icnv2 based on a difference ΔIL between the reference current ILr and the load current IL (ΔIL=ILr−IL). When the current command value Icnv1 has the same phase as the AC current Isw, the current flowing from the output terminal T2 toward the input terminal T1 (corresponding to the direction indicated by the arrow A2 in FIG. 4) has a phase opposite to that of the AC current Isw.

The converter control unit 24 adds the current command value Icnv1 and the current command value Icnv2 to generate a current command value Icnv*(Icnv*=Icnv1+Icnv2). The converter control unit 24 generates a sinusoidal voltage command value VO* based on the current command value Icnv*, and generates a control signal (PWM signal) based on the generated voltage command value VO*.

When the detection signal DET from the detection unit 22 is at the L level, the converter control unit 24 sets the bidirectional converter 14 to a standby condition at which the bidirectional converter 14 can be instantly activated. When the detection signal DET is activated from the L level to the H level, in other words, when an open command to the circuit breaker 5 is detected, the converter control unit 24 sends the generated control signal (PWM signal) to the bidirectional converter 14 to activate the bidirectional converter 14. Thus, as illustrated in FIG. 4, the AC current Icnv having a value corresponding to the current command value Icnv* is output from the bidirectional converter 14. The AC current Icnv output from the bidirectional converter 14 is supplied to the AC switch SW and to the load 2. A part of the AC current Icnv, which is supplied to the AC switch SW, has a phase opposite to that of the AC current Isw with respect to the AC switch SW. Therefore, the amplitude of the AC current Isw becomes equal to 0 A.

The switch control unit 26 controls the ON/OFF of each AC switch SW in the switch circuit 12 based on the AC current Isw detected by the current detector 15 and the AC voltage VI detected by the voltage detector 16. Specifically, when the AC voltage VI is greater than the lower limit voltage, the switch control unit 26 turns on each AC switch SW. When the AC voltage VI drops below the lower limit voltage, the switch control unit 26 turns off each AC switch SW on condition that the amplitude of the AC current Isw becomes equal to 0 A.

Figure 6:
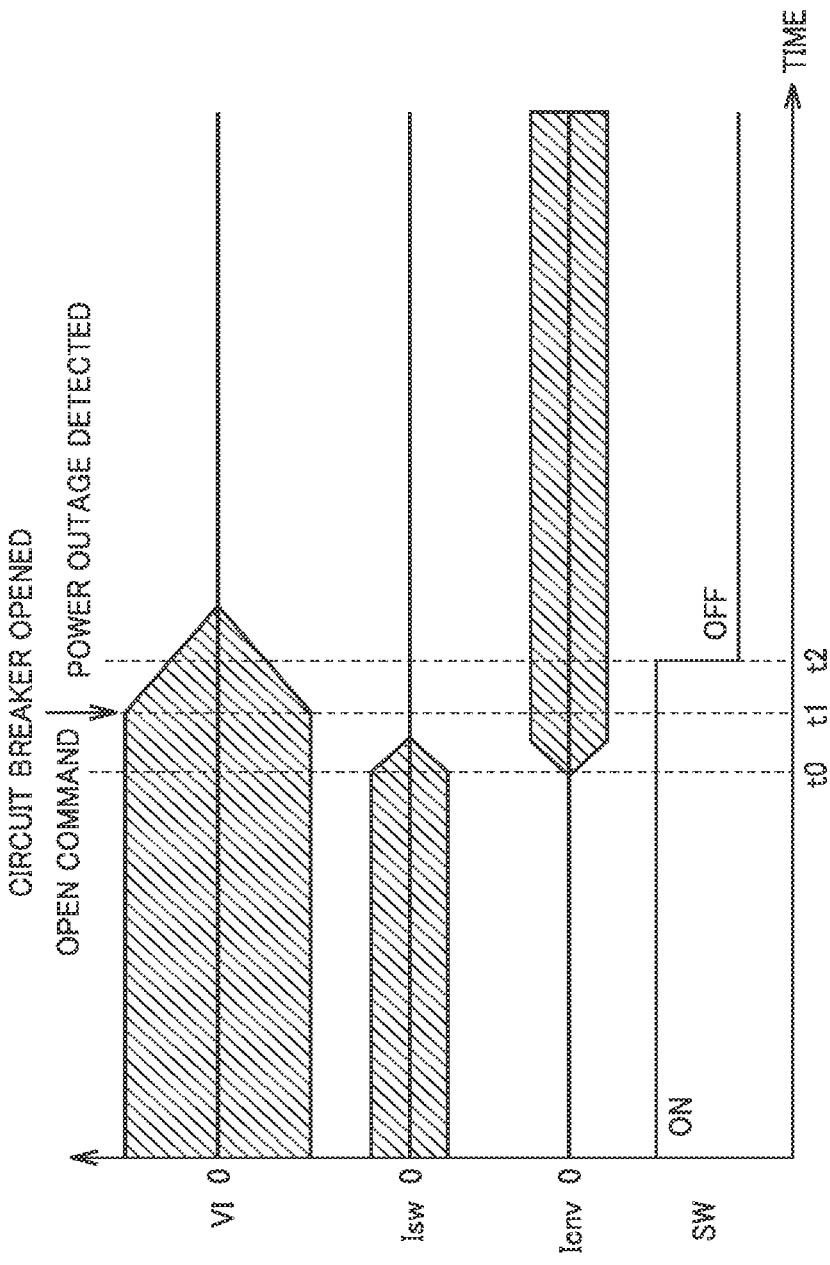
FIG. 6 is a timing chart illustrating the operation of the power supply device according to the first embodiment.

FIG. 6 is a timing chart illustrating the operation of the power supply device 10 according to the first embodiment in comparison with that illustrated in FIG. 3. FIG. 6 shows time waveforms of the AC voltage VI, the AC current Isw flowing through each AC switch SW of the switch circuit 12, the AC current Icnv output from the bidirectional converter 14, and the state of the AC switch SW.

In FIG. 6, it is assumed that the open command sent to the circuit breaker 5 is detected at time t0. In this case, the circuit breaker 5 is opened at time t1 after time t0. The period from time t0 to t1 is used to determine whether the signal sent to the circuit breaker 5 is an open command or noise. After time t1, the amplitude of the AC voltage VI decreases in response to the open operation of the circuit breaker 5.

When the open command is detected at time t0, the controller 20 controls the bidirectional converter 14 so as to supply an AC current having a phase opposite to that of the AC current Isw flowing through the AC switch SW to flow through the AC switch SW and make the load current IL equal to the reference current ILr. Accordingly, after time t0, the amplitude of the AC current Icnv output from the bidirectional converter 14 increases.

At this time, in the AC switch SW, the AC current Isw and the AC current of the opposite phase supplied from the bidirectional converter 14 cancel each other, so that the amplitude of the AC current Isw gradually decreases and finally becomes equal to 0 A. A part of the AC current Icnv output from the bidirectional converter 14 is supplied to the load 2.

When the AC voltage VI detected by the voltage detector 16 drops below the lower limit voltage (at time t2), the controller 20 determines that the AC voltage VI is not normally supplied, and thereby turns off each AC switch SW. The controller 20 sends an L-level gate signal G to the semiconductor switch 13 of each AC switch SW.

As illustrated in FIG. 6, at the time (time t2) when the AC switch SW is turned off, the AC current Isw flowing through the AC switch SW is not present. In other words, no current flows through the semiconductor switch 13. Thus, no surge voltage is generated when the semiconductor switch 13 is turned off, and as a result, the resonance phenomenon described above is prevented from occurring.

Figure 7:
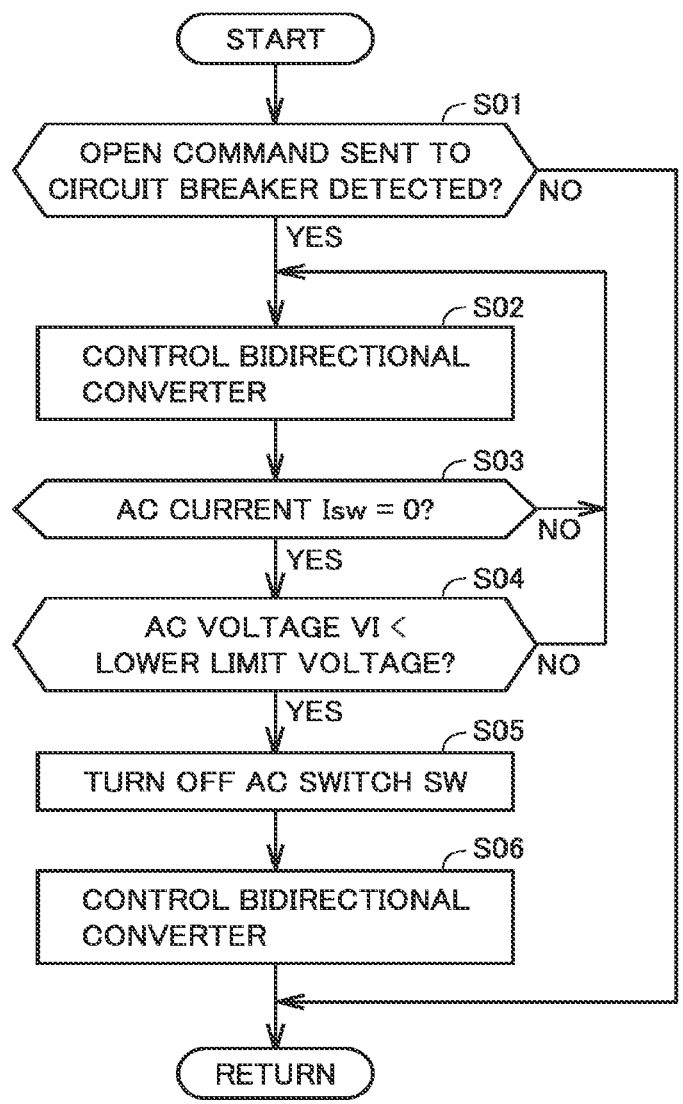
FIG. 7 is a flowchart illustrating a control process to be performed in the power supply device according to the first embodiment.

FIG. 7 is a flowchart illustrating a control process to be performed in the power supply device 10 according to the first embodiment. Each step of the control process illustrated in FIG. 7 can be realized by the controller 20 executing a program stored in advance in the memory.

As illustrated in FIG. 7, in step (hereinafter simply referred to as "S") 01, the controller 20 determines whether or not an open command sent to the circuit breaker 5 is detected. For example, when an open command is received from a host controller, the determination result in S01 is YES, otherwise the determination result is NO.

If the open command to the circuit breaker 5 is detected (YES in S01), the controller 20 controls the bidirectional converter 14 in S02 so as to supply the AC current having the opposite phase to that of the AC current Isw to flow through the AC switch SW and make the load current IL equal to the reference current ILr. In S02, the controller 20 generates a current command value Icnv* for the AC current Icnv output from the bidirectional converter 14 based on the AC current Isw, the load current IL, and the reference current ILr. The controller 20 generates a voltage command value VO* based on the current command value Icnv*, and generates a control signal (PWM signal) of the bidirectional converter 14 based on the generated voltage command value VO*.

In S03, the controller 20 determines whether or not the amplitude of the AC current Isw flowing through the AC switch SW is 0 A based on the detection value of the current detector 15. If the amplitude of the AC current Isw is 0 A (YES in S03), the process proceeds to S04 where the controller 20 determines whether or not the AC voltage VI is less than the lower limit voltage based on the detection value of the voltage detector 16. If the amplitude of the AC current Isw is not 0 A (NO in S03), or if the AC voltage VI is equal to or higher than the lower limit voltage (NO in S04), the process returns to S02.

On the other hand, if the AC voltage VI is less than the lower limit voltage (YES in S04), the controller 20 turns off each AC switch SW of the switch circuit 12 in S05. When each AC switch SW is turned off, the power supply from the AC power supply 1 is stopped.

In S06, the controller 20, based on the AC voltage VO and the load current IL, controls the bidirectional converter 14 so as to make the AC voltage VO equal to the reference voltage VOr. In S06, the bidirectional converter 14 converts the DC power from the battery 3 into AC power and supplies the AC power to the load 2. When the voltage VB between the terminals of the battery 3 drops to the lower limit voltage, the controller 20 stops the operation of the bidirectional converter 14.

As described above, according to the power supply device according to the first embodiment, when the open state of the circuit breaker 5 disposed between the AC power supply 1 and the input terminal T1 of the power supply device 10 is detected, the controller 20 controls the bidirectional converter 14 so as to supply the AC current having an opposite phase to that of the AC current Isw flowing through the AC switch SW connected between the input terminal T1 and the output terminal T2 to flow through the AC switch SW and make the load current IL equal to the reference current ILr. Thus, the semiconductor switch 13 can be turned off in such a state that no current flows through the semiconductor switch 13 while the power is being stably supplied to the load 2. Therefore, the surge voltage is prevented from being generated when the semiconductor switch 13 is turned off, which makes it possible to prevent a resonance phenomenon from occurring between the capacitor of the snubber circuit SN and the inductance of the voltage detector 16.

Second Embodiment

In the first embodiment described above, it is described that the controller 20 detects the open state of the circuit breaker 5 by detecting an open command sent to the circuit breaker 5. On the other hand, when a short circuit accident or the like occurs in the power system, the circuit breaker 5 opens autonomously irrespective of the open command from the host controller. In the second embodiment, an example configuration for detecting the open state of the circuit breaker 5 when the circuit breaker 5 opens autonomously will be described. Since the configuration of the power supply device according to the second embodiment is the same as the configuration of the power supply device 10 according to the first embodiment illustrated in FIG. 1, the description thereof will not be repeated.

Figure 8:
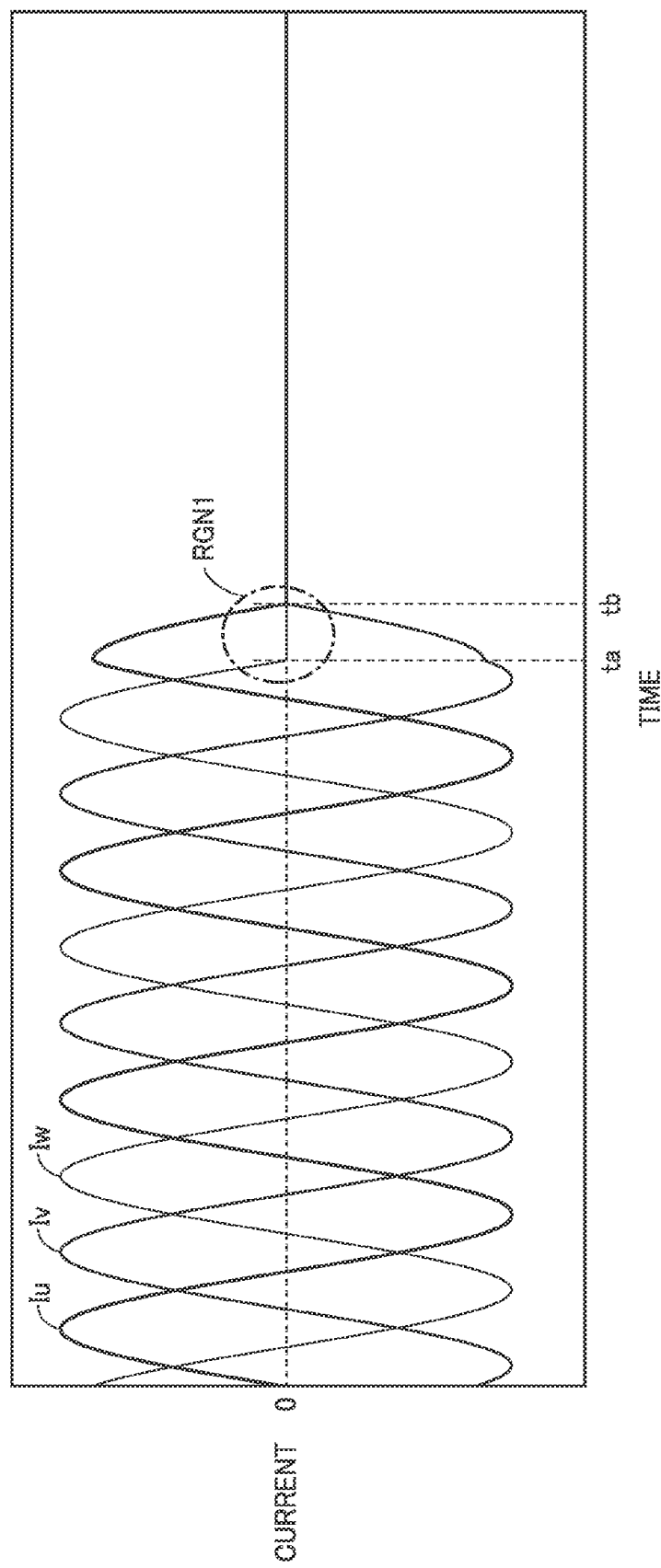
FIG. 8 is an operation waveform diagram illustrating an open operation of a circuit breaker.

FIG. 8 is an operation waveform diagram illustrating an open operation of the circuit breaker 5. FIG. 8 shows waveforms of three-phase AC currents (a U-phase current Iu, a V-phase current Iv, and a W-phase current Iw) supplied from the AC power supply 1 to the input terminal T1.

In the mechanical switch included in the circuit breaker 5, when a pair of contacts is opened during energization, an arc discharge may be generated between the pair of contacts. Therefore, even after the pair of contacts are opened, the current continues to flow for a short moment. Therefore, the three-phase AC currents Iu, Iv and Iw are cut off in order since the current flowing through the pair of contacts in the corresponding circuit breaker 5 becomes equal to 0 A.

As illustrated in FIG. 8, the W-phase current Iw firstly becomes equal to 0 A at time ta, and thereby is cut off (see region RGN1). Since the W-phase current Iw is cut off, the U-phase current Iu and the V-phase current Iv become opposite to each other in phase. At time tb after time ta, both the U-phase current Iu and the V-phase current Iv become equal to 0 A. The period from time ta to time tb is approximately several milliseconds.

In the power supply device 10 according to the second embodiment, the controller 20, based on the characteristics of the open operation described above, detects the open state of the circuit breaker 5 based on the AC current Isw (three-phase AC currents Iu, Iv and Iw) detected by the current detector 15.

Specifically, the controller 20 determines whether or not the value of any one current of the three-phase AC currents Iu, Iv and Iw detected by the current detector 15 has been maintained at 0 A longer than a predetermined threshold time. The threshold time is set shorter than the period from time ta to time tb.

In the case of FIG. 8, when the current value of the W-phase current Iw becomes 0 A at time ta, the controller 20 measures a period during which the current value is maintained at 0 A. If the measured period is greater than the threshold time, the controller 20 detects that the circuit breaker 5 is opened.

Figure 9:
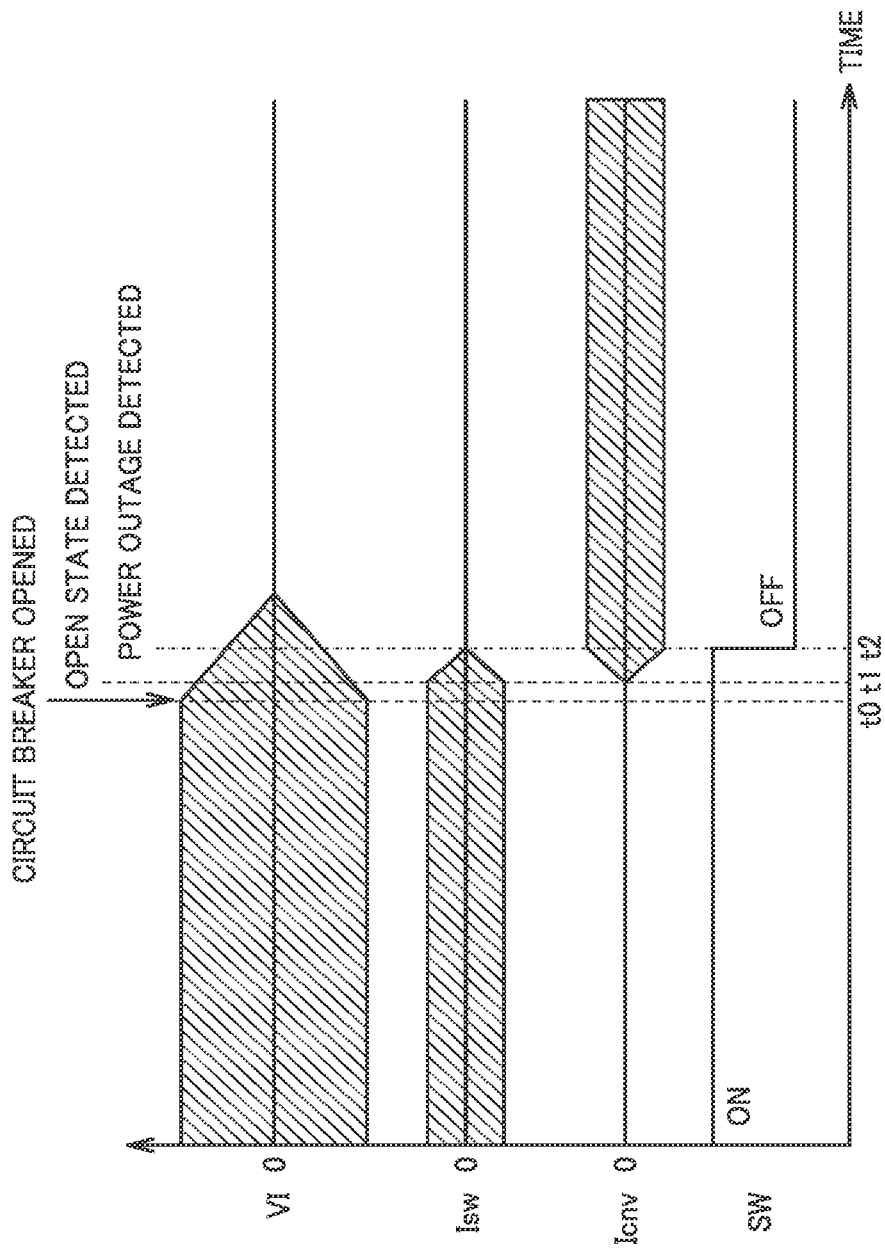
FIG. 9 is a timing chart illustrating the operation of a power supply device according to a second embodiment.

FIG. 9 is a timing chart illustrating the operation of the power supply device 10 according to the second embodiment in comparison with that illustrated in FIG. 3. FIG. 9 shows time waveforms of the AC voltage VI, the AC current Isw flowing through each AC switch SW of the switch circuit 12, the AC current Icnv output from the bidirectional converter 14, and the state of the AC switch SW.

In FIG. 9, it is assumed that the circuit breaker 5 is opened in response to the occurrence of a short circuit accident in the power system at time t0. In this case, as illustrated in FIG. 8, after time t0, any one current of the three-phase AC currents Iu, Iv and Iw supplied from the AC power supply 1 firstly becomes equal to 0 A, and the remaining two AC currents become equal to 0 A thereafter. After time t0, the amplitude of the AC voltage VI decreases in response to the open operation of the circuit breaker 5.

Based on the AC current Isw detected by the current detector 15, the controller 20 determines whether or not the value of any one current of the three-phase AC currents Iu, Iv and Iw detected by the current detector 15 has been maintained at 0 A longer than a predetermined threshold time. In the example of FIG. 9, when the amplitude of an AC current of any one phase becomes equal to 0 A at a time after the time t0, the controller 20 measures a period during which the current value is maintained at 0 A. When the measured period is greater than the threshold time (time t1), the controller 20 detects that the circuit breaker 5 is opened.

When the open state of the circuit breaker 5 is detected, the controller 20 controls the bidirectional converter 14 in accordance with the same procedure as in the first embodiment so as to supply an AC current having an opposite phase to that of the AC current Isw flowing through the AC switch SW to flow through the AC switch SW and make the load current IL equal to the reference current ILr. Accordingly, after time t1, the amplitude of the AC current Icnv output from the bidirectional converter 14 increases.

At this time, in the AC switch SW, the AC current Isw and the AC current of the opposite phase supplied from the bidirectional converter 14 cancel each other, so that the amplitude of the AC current Isw gradually decreases and finally becomes equal to 0 A. A part of the AC current Icnv output from the bidirectional converter 14 is supplied to the load 2.

When the AC voltage VI detected by the voltage detector 16 drops below the lower limit voltage (at time t2), the controller 20 determines that the AC voltage VI is not normally supplied, and thereby turns off each AC switch SW. The controller 20 sends an L-level gate signal G to the semiconductor switch 13 of each AC switch SW.

As illustrated in FIG. 9, at the time (time t2) when the AC switch SW is turned off, the AC current Isw flowing through the AC switch SW is not present. In other words, no current flows through the semiconductor switch 13. Thus, no surge voltage is generated when the semiconductor switch 13 is turned off, and as a result, the resonance phenomenon described above is prevented from occurring.

Figure 10:
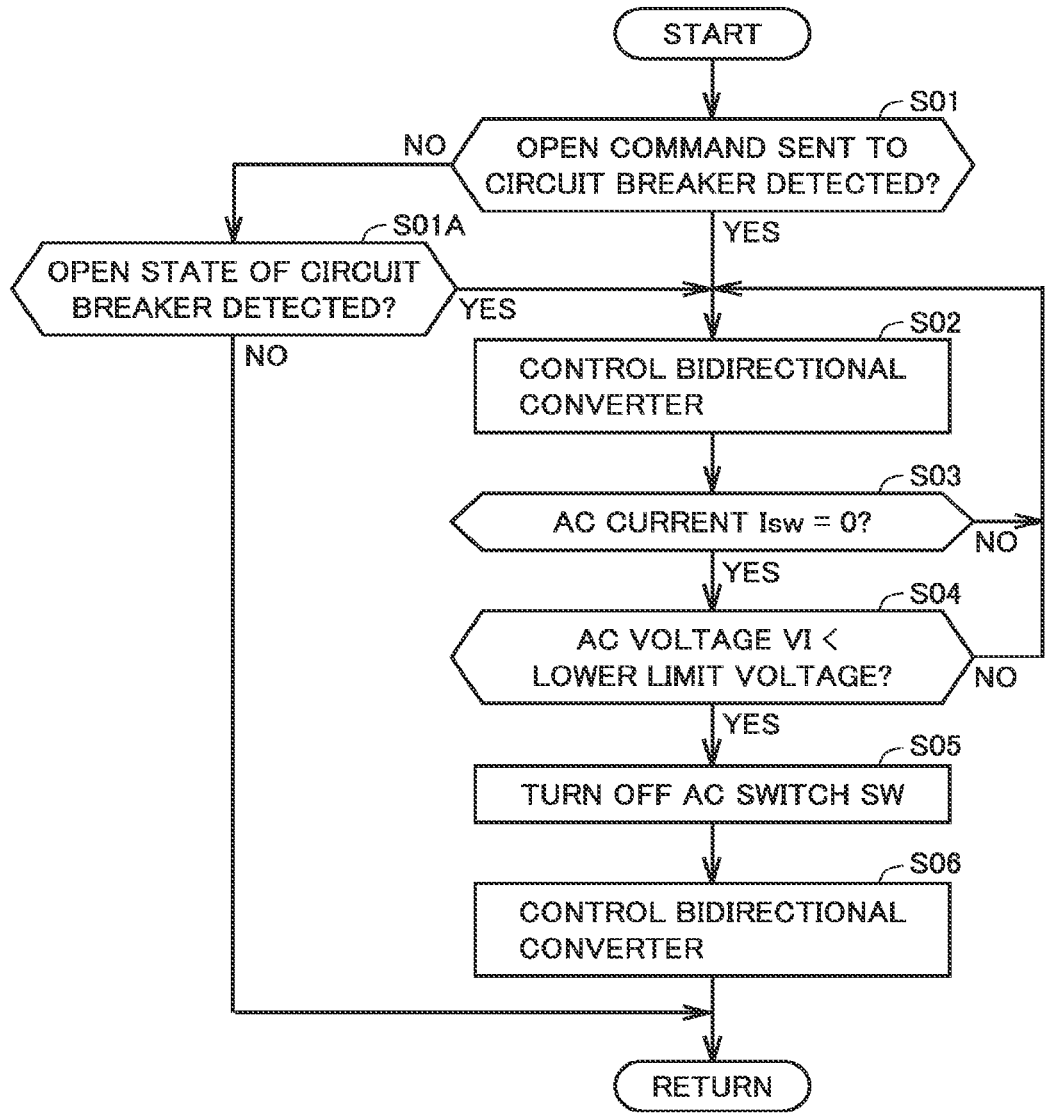
FIG. 10 is a flowchart illustrating a control process to be performed in the power supply device according to the second embodiment.

FIG. 10 is a flowchart illustrating a control process to be performed in the power supply device 10 according to the second embodiment. The flowchart illustrated in FIG. 10 is different from the flowchart illustrated in FIG. 7 with the addition of step S01A.

As illustrated in FIG. 10, if an open command to the circuit breaker 5 is not detected in S01 (NO in S01), the process proceeds to S01A where the controller 20 determines whether or not the open state of the circuit breaker 5 is detected. As described above, in S01A, the controller 20, based on the AC current Isw detected by the current detector 15, determines whether or not any one current of the three-phase AC currents Iu, Iv and Iw has been maintained at 0 A longer than the threshold time. If the current value of the AC current of any one phase has been maintained at 0 A longer than the threshold time, the determination result in S01A is YES, otherwise the determination result is NO.

If the open state of the circuit breaker 5 is detected in S01A (YES in S01A), the controller 20 executes step S02 and the following steps in the same manner as those in FIG. 7. In other words, the controller 20 controls the bidirectional converter 14 so as to supply the AC current having the opposite phase to that of the AC current Isw to flow through the AC switch SW and make the load current IL equal to the reference current ILr (S02). If the amplitude of the AC current Isw is 0 A (YES in S03), and the AC voltage VI is less than the lower limit voltage (YES in S04), the controller 20 turns off each AC switch SW of the switch circuit 12 in S05. When each AC switch SW is turned off, the power supply from the AC power supply 1 is stopped.

As described above, according to the power supply device of the second embodiment, since the open state of the circuit breaker 5 can be detected based on the waveform of the AC current Isw flowing through the AC switch SW connected between the input terminal T1 and the output terminal T2, it is possible to obtain the same effect as that of the first embodiment.

The embodiments disclosed herein are merely by way of example and not limited thereto. The scope of the present invention is defined by the terms of the claims, rather than the description above, and is intended to include any modifications within the meaning and scope equivalent to the terms of the claims.

REFERENCE SIGNS LIST

1: AC power supply; 2: load; 3: battery; 5: circuit breaker; 10: power supply device; 12: switch circuit; 12a: input node; 12b: output node; 13: semiconductor switch; 14: bidirectional converter; 15, 17: current detector; 16, 18, 19: voltage detector; 20: controller; 22: detection unit; 24: converter control unit; 26: switch control unit; T1: input terminal; T2: output terminal; T3: DC terminal; SW1 to SWn, SW: AC switch; Q, QA, QB: IGBT; D, DA, DB: diode; SN: snubber circuit; Z: resistor

The invention claimed is:

1. A power supply device comprising:
a first terminal that is connected to an AC power supply via a circuit breaker;
a second terminal that is connected to a load;
an AC switch that includes a semiconductor switch and a snubber circuit connected in parallel to each other between the first terminal and the second terminal;
a power converter that is connected between a power storage device and the second terminal to convert DC power from the power storage device into AC power and output the AC power to the second terminal;
a current detector that detects a current flowing through the AC switch;
a voltage detector that detects an AC voltage input to the first terminal; and
a controller that controls the AC switch and the power converter based on a detection value of the voltage detector,
when the AC power supply is normal, the controller turns on the semiconductor switch so as to supply AC power from the AC power supply to the load via the AC switch,
when an open state of the circuit breaker is detected,
the controller controls the power converter so as to supply a current having a phase opposite to that of the current detected by the current detector to flow through the semiconductor switch and supply the AC power to the load, and
the controller turns off the semiconductor switch in response to that an amplitude of the current detected by the current detector is 0.

2. The power supply device according to claim 1, wherein the circuit breaker includes a mechanical switch,
the circuit breaker opens the mechanical switch in response to an open command sent from outside of the circuit breaker, and
the controller detects the open state of the circuit breaker based on the detection of the open command sent to the circuit breaker.

3. The power supply device according to claim 1, wherein the AC power supply is a three-phase AC power supply,
the current detector detects three phase AC currents flowing through the AC switch, and
the controller detects the open state of the circuit breaker based on that any one phase AC current of the three phase AC currents detected by the current detector has been maintained at 0 for a predetermined time.

4. The power supply device according to claim 3, wherein the circuit breaker includes a mechanical switch,
the circuit breaker opens the mechanical switch when an accident occurs in a power system equipped with the AC power supply.

5. The power supply device according to claim 1, wherein the controller turns off the semiconductor switch, and controls the power converter to convert DC power of the power storage device into AC power and supply the AC power to the load.

* * * * *